United States Patent [19]

Meunier, deceased et al.

[11] Patent Number: 4,867,779
[45] Date of Patent: Sep. 19, 1989

[54] NUTRITIVE GLASSES FOR AGRICULTURE

[75] Inventors: Jean-Paul Meunier, deceased, late of Clermont, by Xavier Gillet, executor; Guy Matzen, Paris; Denise Blanc, Antibes; Maryse Montarone, Nice, all of France

[73] Assignee: Isover Saint-Gobain, Courbevoie, France

[21] Appl. No.: 942,722

[22] Filed: Dec. 17, 1986

[30] Foreign Application Priority Data

Dec. 17, 1985 [FR] France .................. 85 18672

[51] Int. Cl.$^4$ .................. C05G 3/00; C05D 9/02
[52] U.S. Cl. .................. 71/62; 71/64.13; 501/35; 501/63
[58] Field of Search .............. 71/1, 62, 64.13, 52; 501/35, 63

[56] References Cited

U.S. PATENT DOCUMENTS

| | | | |
|---|---|---|---|
| 3,513,002 | 5/1970 | Labino | 501/35 |
| 3,736,162 | 5/1973 | Chvalousky et al. | 501/35 |
| 3,853,569 | 12/1974 | Laurent et al. | 501/35 |
| 3,873,328 | 3/1975 | Bruegg | 501/35 |
| 3,969,121 | 7/1976 | Atkinson | 501/63 |
| 3,992,184 | 11/1976 | Baldock | 71/62 |
| 4,334,908 | 6/1982 | Duchateau et al. | 71/52 |

FOREIGN PATENT DOCUMENTS 8304248  6/1983  PCT Int'l Appl. .................. 71/62

Primary Examiner—Ferris H. Lander
Attorney, Agent, or Firm—Oblon, Spivak, McClelland, Maier & Neustadt

[57] ABSTRACT

A vitreous product which can be used in agriculture is disclosed. With the exception of nitrogen, this vetreous product contains all the major and minor mineral elements which are essential for the nutrition of plants.

The vitreous products can contain the following constituents, taken in the following proportions by weight:

| | | | |
|---|---|---|---|
| $SiO_2$ | 25 to 65% | $Fe_2O_3$ | 1 to 15% |
| $P_2O_5$ | 1 to 15% | $B_2O_3$ | 0.01 to 2% |
| $K_2O$ | 5 to 35% | MnO | 0.01 to 3% |
| CaO | 11 to 35% | ZnO | 0.01 to 3% |
| MgO | 1 to 10% | CuO | 0.01 to 2% |
| $SO_3$ | 0.01 to 1% | $MoO_3$ | 0.01 to 3% |
| | | $Na_2O$ | 0 to 2% |
| | | $Al_2O_3$ | 0 to 25% |

7 Claims, No Drawings

NUTRITIVE GLASSES FOR AGRICULTURE

BACKGROUND OF THE INVENTION

1. Field of the Invention

The present invention relates to glass compositions for the manufacture of materials intended for use in agriculture field. More specifically, the present invention relates to vitreous products intended for plant nutrition.

2. Discussion of the Background

Glass fibers or glass powders can be used as examples of vitreous products within the sense of the invention.

The term "glass powders" mean any powdery glass material obtained by all known methods of fragmentation. Thus glass, having any shape whatsoever following the pouring operation, can be crushed, ground and sieved to obtain a glass powder.

The glass powder can also be obtained by pouring glass directly into water where the glass is subjected to violent cooling which provokes the appearance of sufficiently strong internal pressures to cause fragmentation of the glass into fine particles. These particles are subsequently dried and sieved to obtain a glass powder.

It is possible to include a very large variety of elements in the glass compositions and the most varied applications can be envisaged. The selection of the compositions generally depends on a compromise between several needs which are frequently contradictory: the cost of the various raw materials, the requirements imposed by the devices for working the manufacturing methods and the desired properties. In the field of agriculture and in particular that of plant nutrition, glass compositions leaving advantageous exchange capability with the medium with which they are in contact, are preferred.

In effect, plants need a large number of mineral elements for their growth. These elements, for the most part, can be included in a glass composition. Depending on the plant's content in each of the elements, they are generally classified in two categories: macroelements or major elements which include N, P, K, S, Ca and Mg; and trace elements or minor elements, which are also indispensable but are present in smaller quantities and which include Fe, Mn, Zn, B, Cu and Mo.

A plant normally draws the necessary elements for its growth from the soil. Not all soils, however, possess properties suitable for satisfactory plant nutrition. Some are too poor or totally lacking in indispensable elements for plant growth. Others effectively contain these elements, but the transfer to the plant does not take place correctly in the amounts necessary for satisfactory growth.

For efficacious transfer of the elements to the plant, the nutritive element must be capable of being soluble in the liquid phase of the culture medium, with only the element in solution being capable of being assimilated by the plant. However, this solubility must also be controlled and take place in proportion corresponding to the absorption needs for the elements in question by the plant, and therefore in proportion with the needs of the plant. If the solubility required is not provided, the effectively liberated elements can be drained-off or even react chemically with the soil, and are not assimilated by the plant.

Means have therefore been developed either for enriching the soil with elements which are indispensable to the plant, or for improving the capability of the plants to assimilate said elements.

The practice of culture out of the soil has also been strongly developed. In accordance with this technique, varied substrates are used which support the roots of the plants and are fed with a nutritive solution which contains the elements necessary for the growth of the plants. The selection of the elements and their proportions in a nutritive solution depends on the needs of the plant. The selection of the type of substrate itself depends on its qualities for facilitating culture. Among all these required qualities, the absence of elements which are toxic to plants, the absence of pathogenic elements, good resistance to degradation and to packing can be cited as being particularly important.

Since the substrate therefore can constitute the sole medium for development of the root system, certain physical characteristics are also required: in particular, these are a good water retention capability, which enables the watering rhythm to be determined; a capability for aerating the root medium, which is conditioned by the density of the substrate. The substrate must also ensure good circulation of the nutritive solution.

Vitreous products such as glass fibers and powders intended to be applied in the field of agriculture are known. For example, U.S. Pat. No. 2,192,939 describes glass fibers packed in the form of a fiber pad arranged on the ground before seeding it. The fibers described in this patent contain elements known for their fertilizing properties, which are easily soluble and are introduced in appropriate quantities for enriching the soil. The glass compositions selected provide, for the most part, phosphorus and potassium. They fulfill a multiple role which is always associated with the soil: enrichment or protection of the soil. The growth of the plants is therefore provided by the combined contribution of the soil and the fiber pad.

From the publication of German Patent DE-AS 1 008 757, glass powders are also known which are obtained by melting of the composition and then sudden cooling in water followed by a drying and sieving operation. These glass powders can be used directly as a nutritive support and render certain nutritive elements directly accessible to the roots. In spite of the presence of one or several nutritive elements in this product, it is supplied with a solution which itself contains one or several nutritive elements. With such a system, the growth is produced by the combined contribution of the support and the nutritive solution.

The present invention has therefore as an object to provide a new vitreous product which can be applied to agriculture and which has improved properties in relation to the known agricultural products. In particularly this invention also has as an object to provide a nutritive medium for the culture of plants outside of the earth, i.e., a medium which combines the functions of nutrition and of support for the root system of the plants.

In this regard, the object of this invention is to simplify the work of the horticulturist. In effect, in the most common operation of a method of culture outside the earth as described above, on a substrate which is agronomically inert, the elements which are essential to the plants are brought by the nutritive solution which must contain them all. However, due to the fact of the multiplicity of the elements, the preparation of such a solution requires a certain number of precautions which take a lot of time. In particular, in order to avoid the formation of precipitates, several solutions must be prepared separately each containing a limited number of elements, and they must be used immediately.

In this regard, one of the objects of the invention is to eliminate the nutritive solution. The previously cited prior art does not eliminate this disadvantage insofar as the use of a more less complex nutritive solution is always provided.

SUMMARY OF THE INVENTION

Accordingly, it is an object of the invention to provide a novel vitreous material which can be used advantageously in agriculture.

It is another object of this invention to enable plant growth in a culture medium which is independent of the soil, without exterior nutritive addition other than nitrogen.

In order to achieve all these objects and others which will become apparent from the description of the invention given herein below, the present invention provides a vitreous product which is characterized by the fact that it contains, with the exception of nitrogen, all the major and minor mineral elements which are essential for plant nutrition, and which are capable of being kept by the plant's root system in the surrounding medium. The quantities and proportions of the constituent components used in the preparation of this product is selected such that the nutritive elements are soluble and can be assimilated by the plants. Therefore, the vitreous product in accordance with the invention can alone constitute a complete source for all of the nutrient required for plant growth, with the exception of nitrogen or it can be used as a soil additive. This vitreous product is suitable for plant growth and nutrition.

DESCRIPTION OF THE PREFERRED EMBODIMENTS

More specifically, the vitreous product of the invention contains, as major mineral elements, P, K, Ca, Mg, S, and as minor mineral elements Fe, B, Mn, Zn, Cu, Mo, provided by the following oxides: $P_2O_5$, $K_2O$, CaO, MgO, $SO_3$, $Fe_2O_3$, $B_2O_3$, MnO, ZnO, CuO, $MoO_3$, as well as silica. The silica acts as a base for the vitreous matrix.

The proportions of the various constituents are of course selected so that the necessary elements are found in the plants in adequate proportions. By way of indication, the content of mineral elements in whole plants can be recalled: nitrogen, phosphorus, potassium, calcium and magnesium are generally present in plants in amounts of greater than 1 mg per gram of dry material. For 100 parts of dry material, there are 1 to 5 parts of nitrogen and potassium, and 1 to 4 parts of calcium. Sulfur, magnesium and phosphorus are found in amounts of less than 1 part. With regard to the minor elements, or trace elements, iron, boron and manganese represent a few hundred micrograms (ppm), zinc and copper a few tens of micrograms and molybdenum is most frequently less than one microgram.

The inventors have discovered a composition which contains the following constituents, taken in the following weight proportions, which can be used to advantage in the present invention:

| | | | |
|---|---|---|---|
| $SiO_2$ | 25 to 65% | $Fe_2O_3$ | 1 to 15% |
| $P_2O_5$ | 1 to 15% | $B_2O_3$ | 0.01 to 2% |
| $K_2O$ | 5 to 35% | MnO | 0.01 to 3% |
| CaO | 11 to 35% | ZnO | 0.01 to 3% |
| MgO | 1 to 10% | CuO | 0.01 to 2% |
| $SO_3$ | 0.01 to 1% | $MoO_3$ | 0.01 to 3% |
| | | $Na_2O$ | 0 to 2% |
| | | $Al_2O_3$ | 0 to 25% |

The compositions are determined by standard chemical analysis of the glass.

It has in addition been noted that, by addition of alumina, it was possible to control the kinetics of dissolving the nutritive elements under the action of water, in order to adapt it to the needs of the plants. This constituent, which is not necessary for nutrition, is, in accordance with a preferred characteristic of the invention, present in the composition, with a weight content of less than 7%.

Certain plants absorb sodium even though its exact role has not yet been determined. The products of the invention preferably contain $Na_2O$. This constituent also has a beneficial effect on the preparation of the glass.

The following compositions are particularly suitable for the objects of the invention. They contain the following constituents, taken in the following weight proportions:

| | | | |
|---|---|---|---|
| $SiO_2$ | 40 to 55% | $Fe_3O_3$ | 2 to 5% |
| $P_2O_5$ | 5 to 8% | $B_2O_3$ | 0.1 to 0.3% |
| $K_2O$ | 15 to 20% | MnO | 0.1 to 0.3% |
| CaO | 13 to 18% | ZnO | 0.1 to 0.3% |
| MgO | 4 to 7% | CuO | 0.1 to 0.2% |
| $SO_3$ | 0.1 to 0.3% | $MoO_3$ | 0.05 to 0.1% |
| | | $Al_2O_3$ | <7% |
| | | $Na_2O$ | 0.1 to 0.5% |

As discussed above, the products of the invention can be glass fibers or glass powders.

Within the framework of the invention, the glass fibers can be prepared by all known methods of manufacturing glass fibers. A common method of preparation consists of forming the fibers by passage of the melted glass composition in a centrifugal drawplate. However, the glass compositions selected within the framework of the invention have a fairly high fibering temperature, on the order of 1400° C.

One particularly advantageous method of preparation is, for example, that described in French Patent 2 374 440 which is hereby incorporated by reference. In accordance with this method, the fibers are obtained from a static drawplate by drawing using gaseous currents which interact so as to form regular vortexes.

One of the advantages obtained by using the products of the invention in the form of fibers or powders comes from the possibility of varying the size of the fibers or grains, so as to obtain a suitable specific surface area. In effect, it is known that the chemical attack of the glass is all the more rapid if it is in a form with a larger specific surface area. The speed with which the elements are placed in solution can also be controlled by this means. However, conditions are not identical for the fibers are the powders.

In the case of powders, the method of preparation does not always provide a homogeneous granulometric distribution. At best, a powder is obtained wherein the majority of grains have a size below a given value, but the differences can be considerable from one grain to another. Due to these distortions and under the action of water, grain segregation phenomena may appear in a substrate containing these powders: for example, the smallest grains are taken up by leaching and fall to the bottom of the substrate. In all cases, it is difficult to conserve an attack surface for the position which is homogeneous throughout the substrate and to be able to check the solubility of the elements and, subsequently, to check their faculty of assimilation by the plants.

In the case of fibers, the method of preparation provides both a homogeneous specific surface area at all points of the fibrous surface and control of the value of this specific surface area through control of the diameter of the fibers. Since the fibers are generally obtained by passage through a drawplate, adjustment of the device enables the diameter of the fibers produced to be fixed in advance. In the case of fibers, the nutrition function is therefore facilitated as compared to the powders.

Moreover, the function of maintaining the plant's root system is also facilitated. The use of glass compositions in the form of fibers assists in interlocking roots and fibers.

Finally, the water retention capability is increased for fibers as compared with powders.

The above considerations mean that a preferred embodiment of the invention consists of using glass compositions in the form of fibers. These fibers preferably have a diameter of between 3 and 9 micrometers, which corresponds to a specific surface area on the order of 0.25 to 0.35 m²/g, preferably 0.29 to 0.31 m²/g, most preferably about 0.3 m²/g.

The specific surface area S is related to the diameter, d, by the following formula:

$$S = \frac{4}{\rho d}, \text{ or}$$

or S designates a mass volume of 2500 kg/m³, that is $$S = \frac{1.6}{\rho d},$$

where d is expressed in micrometers.

It is much more difficult to prepare glass powders whose sizes are such that the specific surface area reaches these values.

Mineral fiber felts are ordinarily combined with organic binders such as phenoplast or aminoplast resins. Within the framework of the invention, the binding of the fibers is an advantageous characteristic. In effect, the presence of an organic binder increases the holding of the fibers, prevents them from being packed, particularly under the action of water, and therefore assists their function of holding the roots of plants. Phenoplast and/or aminoplast resins, on the order of 2 to 15% and preferably 3 to 6% by weight of fibers will be used as a binder. In these amounts, the resins have no substantial influence on the culture itself.

A further object of the invention is a substrate for culture outside the earth comprising the above-defined vitreous products. All combinations can be provided insofar as the functions of nutrition and holding the roots of the plants are effectively fulfilled.

The above-defined vitreous products can, for example, be used as a substrate for culture outside the earth, with materials which are agronomically inert. To date, culture outside the earth has effectively already led to the use of substrates of various types: natural mineral products such as gravel or pozzolana, treated mineral products such as expanded perlite or rock wool, or even fibrous vegetable products such as peat. All these materials can be used in combination with the products of the invention. A substrate can also be used which comprises products in accordance with the invention mixed with agronomically inert glass fibers.

A further possible application of the invention consists of using the products as delay fertilizers, where they are used in combination with soils or substrates which are poor in nutritive elements.

The invention also relates to a method for plant growth and nutrition in accordance with which a substrate such as defined above is supplied with nitrogen. The supply with nitrogen can be carried out by various means. One technique which is particularly appropriate is the so-called subirrigation technique. In accordance with this technique, a nitrogenous aqueous solution moistens the culture medium using capillarity. Such a method of supply is particularly advantageous for raising young plants. In effect, in this case the supply of mineral elements must be rapid and adequate. However, one must prevent the high solubility of the elements from causing uncontrolled leaching under the action of water with high losses of elements. It has been noted that such disadvantages are prevented by using subirrigation.

When the substrate liberate the nutritive elements, the medium tends to become alkaline and excessive alkalization of the medium is a disadvantage. Preferably, therefore, a nitrogenous aqueous solution is used whose pH is acidic, preferably between 2 and 4, so as to bring the pH of the medium below 7. The acidity can be provided by strong acids, among which sulfuric acid or nitric acid can be cited. Sulfuric acid is advantageous insofar as it simultaneously provides a sulfur supplement. Nitric acid is also advantageous insofar as it simultaneously provides the necessary acidity and nitrogen.

Other characteristics and advantages of the invention will become apparent from the following description of examples. The examples relate to glass fibers prepared in accordance with the method described in French Patent 2 374 440, cited above. They have a diameter of approximately 6 micrometers, which corresponds to a specific surface area of 0.26 m²/g.

In order to show the capability of the glass fibers so prepared to nourish the plant, applicant has defined an analytic technique which represents the plant's capability to assimilate the elements.

Table 1 shows the compositions corresponding to the various examples. The amounts of the various elements are given in percentages by weight.

Moreover, with regard to Examples 1 and 2, a series of cultural tests was carried out particularly to show the plant's assimilation of the indispensable mineral elements.

The results obtained will be compared with those obtained by a reference substrate solely comprising sand.

Reference 1

2.5 kg of sand were supplied with a complete nutritive solution, i.e., comprising all the necessary elements for the development of the plant. The granule size of the sand was on the order of 1 to 2 mm. It was placed in a water supply pot of the riviera type, and was in permanent contact with 2 cm of nutritive solution which was present in the bottom of the container and resupplied as needed.

The test was carried out using a species whose production outside the earth is being considerably developed: the cucumber. The variety used was the "long green market gardener" cucumber. The culture was carried out from the sowing stage to the planting stage, as defined by the producers, that is, approximately six well-developed leaves.

The preparation of the culture medium was carried out in the following manner: three seeds were sown and the experiment was interrupted after approximately 36 days, which corresponded to the planting stage as defined by the producers.

The nutritive solution has the following composition, 1 me corresponding to 1 ml of a normal solution:

| | |
|---|---|
| potassium nitrate | 3 me/l |
| potassium phosphate | 2 me/l |
| calcium nitrate | 8 me/l |
| magnesium sulfate | 2 me/l |
| nitric acid | 4 me/l |
| Fe | 800 μl |
| Mn | 200 μl |
| Zn | 200 μl |
| B | 100 μl |
| Cu | 50 μl |
| Mo | 50 μl |

The results observed related on the one hand to the vegetative development of the plant and on the other hand to its mineral composition.

Plant Development

| Reference 1 | Fresh Weight g | Dry Weight g | Weight Leaves g | Weight Stems g | Number Leaves | Total Length cm |
|---|---|---|---|---|---|---|
| | 43.19 | 3.72 | 21.01 | 22.18 | 9.3 | 41.35 |

Mineral Analysis

This relates to the content of major elements: K, Ca, Mg, P, expressed as a percentage of dry material, and to the content of minor elements Fe, Zn, Mn, B, Cu, Mo, expressed in parts per million (ppm).

The determination of the various elements present in the plant sample obtained requires homogeneous sample preparation, so as to obtain suitable bases for comparison from one example to another. This was carried out in the following manner: the plant sample was weighed fresh, then stabilized by rapid infrared drying at a temperature of between 80° and 90° C. so as to prevent any development of unstable products. The drying was continued at a lower temperature, on the order of 70° C., until a constant weight was obtained. The plant was then homogenized by grinding. The grounds were as fine as possible so as to provide a representative sample for analysis.

The determination of the elements was carried out on the mineralized plant powder. The preparation of the sample was carried out in the following manner: exactly 0.5, 1 or 2 g of plant powder was weighed and roasted in a muffle furnace at 500°–550° C. in a quartz or platinum capsule for the determination of the trace elements. 5 ml of pure HCl were added and this was heated in a sand bath until a dry product was obtained. 5 ml of demineralized water was added and this was again heated in a sand bath to obtain a dry product. This was kept for one hour in the sand bath and 5 ml of an aqueous 10% HCl were added and filtering was immediately carried out on a calibrated 100 ml flask. This was washed with hot water and after the flask was filled to 100 ml with water.

All the elements were determined from this preparation. K and Na were determined by flame photometry, Ca and Mg by atomic absorption, $P_2O_5$ by colorimetry using vanadate, possibly after hydrolysis, and Fe, Mn and Cu by colorimetry or atomic absorption.

The results corresponding to Examples Reference 1, 1, Reference 2 and 2 are given in attached Table 2.

EXAMPLE 1

The culture medium this time was composed of 1500g of sand mixed with 10 g of fibers whose composition is given in attached Table 1:

It was supplied by subirrigation using an aqueous solution of nitric acid whose pH was approximately 2. This solution had the advantage of providing the appropriate acidity and the necessary nitrogen using only a single component. When the elements were placed in solution, the medium tended effectively to become alkaline. The analysis of the cucumber leaves showed that all the elements present in the fibers and necessary to the plant were, in relation to Reference 1, assimilated to excess, which could cause toxicity for the cucumber.

In relation to Reference 1, an excess of molybdenum, boron and manganese were particularly noted.

| Example 1 | Fresh Weight g | Dry Weight g | Weight Leaves g | Weight Stems g | Number Leaves | Total Length cm |
|---|---|---|---|---|---|---|
| | 9.12 | 0.86 | 4.49 | 4.63 | 5.6 | 17.87 |

The cucumber plant therefore developed under conditions which were not yet optimal.

Reference 2 and Example 2

The mineral analyses carried out on Examples Reference 2 and 2 (see Table 2) resulted from cultures of Italian Ray Grass. This test plant is a perennial grass whose successive regrowths enable the development in time of the assimilation of the element being studied to be appreciated. The Ray Grass sowing was represented by 1 g of seeds (approximately 340 units) distributed on a surface area of 156 cm². Irrigation was carried out with demineralized water until sprouting. At the end of the culture, a mineral analysis of the plant was carried out. Nine days passed between sowing and sprouting, while the end of the culture was fixed at approximately three months after sprouting.

The sand used was siliceous (lime-free) with round grains having a defined diameter of between 1 mm and 3 mm and with a low water retention capability.

Reference 2

This was composed of 2.5 kg of sand supplied with a complete nutritive solution whose composition was the following:

| | |
|---|---|
| potassium nitrate | 3 me/l (one me corresponds to 1 ml of a normal salt solution), |
| calcium nitrate | 8 me/l |
| potassium phosphate | 2 me/l |

-continued

| | |
|---|---|
| magnesium sulfate | 2 me/l | as well as a solution of trace elements so as to obtain 800 μl of iron, 200 μl of manganese, 200 μl of zinc, 100 μl of boron, 50 μl of copper, 50 μl of molybdenum.

EXAMPLE 2

The culture medium was represented by 7.5 g of fibers for 2.5 kg of sand. The composition of the fibers is given in attached Table 1.

The aqueous solution used was an ammonium nitrate solution acidified to 5.5 me/l.

The composition of the glass fibers could essentially be differentiated from that of Example 1 by an increase in the alumina content and a decrease in the content of certain trace elements, particularly molybdenum. This example showed the influence of the amount of alumina on the capability of the plant to assimilate potassium and phosphorus since, in relation to Reference 2 (see Table 2), Example 2 showed a decrease in the content of these two elements in the plant. This decrease did not appear in in Example 1 in relation to Reference 1.

EXAMPLE 3

This time the culture medium comprised a cube of fibers whose composition is given in attached Table 1. These fibers were bound by means of a phenoplast binder, using 4% by weight of fibers which had a diameter of 6 micrometers. The cube formed had a density of 32 kg/m³ and the following dimensions: 100 mm × 100 mm × 60 mm.

For this example, as well as for the following two examples, the cucumber seeds were sown under the same conditions as in Example 1. The solution supplying the substrate was a nitric acid solution with a pH of 2. The plant's capability for assimilating the nutritive elements were studied using the chemical test of following the kinetic of extraction with ammonium acetate which was perfected by applicant.

The experiment was carried out in the following manner: 1 g of the product was stirred with 50 ml of ammonium acetate at a pH of 7 for variable times, six times for one hour and then once for six hours. The cumulative values of the principal elements extracted are given below:

| | g/kg | | | | mg/kg | |
|---|---|---|---|---|---|---|
| pH | $P_2O_5$ | $K_2O$ | CaO | MgO | $Fe_2O_3$ | MnO |
| 8.02 | 3.78 | 1.91 | 4.73 | 0.63 | 20.5 | 9.2 |

The composition (in accordance with Table 1) is essentially characterized by a very low alumina content which relates to a rapid kinetic of extraction of the various elements in comparison with the following examples. Rapid extraction, which assists the rapid assimilation of the elements by the plants is particularly advantageous where there is no risk of loss through drainage. This is particularly the case where the technique of subirrigation is used to supply a nutritive substrate.

EXAMPLE 4

In relation to Example 3, this example is essentially characterized by a highly increased content of alumina. This difference translates in the following manner with regard to the extraction kinetic.

| | g/kg | | | | mg/kg | |
|---|---|---|---|---|---|---|
| pH | $P_2O_5$ | $K_2O$ | CaO | MgO | $Fe_2O_3$ | MnO |
| 7.37 | 0.55 | 0.91 | 3.79 | 0.35 | 19.9 | 7.7 |

A considerable slowing of the extraction kinetic is therefore apparent, particularly for potassium and phosphorus. Such a property enables a specific application to be envisaged for such a material: it can be used as a delay fertilizer, such that its low solubility is used to advantage. Since these materials are only slightly soluble, the ions are liberated more progressively and the plant therefore uses them in accordance with its needs. In such an application, they are necessarily associated with soils or substrates which are poor in nutritive elements, for which they act as a contributing source of nutritive elements. In such an application, they risk being subjected to more or less important uncontrolled leachings. In this case, therefore, the low solubility of the elements is an advantage since it enables too high losses of elements to be prevented. However, within the main framework of the invention, whic is application of vitreous products as a nutritive substrate, lower amounts of alumina will preferably be selected.

EXAMPLE 5

This is characterized by an intermediate amount of alumina between that of Example 3 and that of Example 4. Extraction with ammonium acetate gives the following results:

| | g/kg | | | | mg/kg | |
|---|---|---|---|---|---|---|
| pH | $P_2O_5$ | $K_2O$ | CaO | MgO | $Fe_2O_3$ | MnO |
| 7.95 | 3.50 | 1.29 | 4.05 | 0.45 | 22.9 | 5.0 |

These results confirm the role played by alumina as a regulator of the plant's capability to assimilate the principal nutritive elements. With the indicated amount of alumina, assimilation by the plant is obtained which is highly appropriate for application of the material as a nutritive substrate.

Moreover, an additional Example 6 was carried out which showed that even when they contain a high proportion of trace elements, the vitreous products of the invention do not have a phytotoxic character.

In these examples, the glass fibers had the following composition:

| | | | |
|---|---|---|---|
| $SiO_2$ | 37.5% | $Fe_2O_3$ | 6.0% |
| $P_2O_5$ | 4.0% | $B_2O_3$ | 0.52% |
| $K_2O$ | 11.1% | MnO | 1.4% |
| CaO | 13.1% | ZnO | 2.0% |
| MgO | 2.9% | CuO | 0.99% |
| $SO_3$ | 0.1% | $MoO_3$ | 0.5% |
| | | $Na_2O$ | 2.0% |
| | | $Al_2O_3$ | 15.3% |

A culture of tomatoes was carried out on a mixture of 5 g of fibers and 1500 g of inert fine sand with grains of an average diameter of approximately 1 mm.

The culture medium was supplied using subirrigation with a complete nutritive solution, such as that described in relation to Reference Example 2. This was carried out so as to accentuate the effect of possible phytotoxicity of the glass.

The variety of tomatoes used was a hybrid with determined growth, called LUCA. The culture was carried out from the sowing stage to the planting stage (floral parts of the first cluster clearly apparent), which is approximately three or four days after the opening of the first flower.

The following results are relative to the plant development for the example under consideration and a reference comprising solely 1.5 kg of sand.

|  | Number Leaves | Height cm | Fresh Weight (g) | Dry Weight (g) |
|---|---|---|---|---|
| Example 6 | 10.6 | 46.3 | 76.3 | 5.7 |
| Sand | 11.0 | 47.3 | 84.9 | 6.3 |

It is therefore apparent that as a substrate, the products of the invention do not have a phytotoxic character. In other words, a large quantity of trace elements in the substrate cannot alone be phytotoxic. Such an example is particularly interesting in an application as a delay fertilizer which takes advantage of a slow speed of liberation of the elements and the possibility of incorporating a large quantity in the product without risking phytotoxicity.

TABLE 1

| Example | Composition (by weight percentages) | | | | | | | | | | | | | |
|---|---|---|---|---|---|---|---|---|---|---|---|---|---|---|
|  | $SiO_2$ | $P_2O_5$ | $K_2O$ | $CaO$ | $MgO$ | $SO_3$ | $Fe_2O_3$ | $B_2O_3$ | $MnO$ | $ZnO$ | $CuO$ | $MoO_3$ | $Na_2O$ | $Al_2O_3$ |
| 1 | 53.30 | 4.60 | 15.90 | 17.40 | 4.90 | 0.30 | 2.0 | 0.60 | 0.22 | 0.25 | 0.10 | 0.07 | 0.08 | 0.10 |
| 2 | 35.40 | 6.30 | 15.50 | 15.10 | 5.20 | 0.20 | 5.0 | 0.60 | 0.21 | 0.22 | 0.12 | 0.07 | 0.02 | 15.10 |
| 3 | 50.70 | 6.70 | 17.20 | 15.30 | 4.80 | 0.10 | 4.0 | 0.11 | 0.14 | 0.32 | 0.10 | 0.03 | 0.05 | 0.10 |
| 4 | 40.80 | 6.60 | 17.0 | 15.30 | 4.90 | 0.10 | 4.0 | 0.12 | 0.14 | 0.2 | 0.10 | 0.03 | 0.10 | 10.0 |
| 5 | 46.10 | 6.50 | 16.80 | 15.30 | 4.90 | 0.10 | 4.0 | 0.12 | 0.14 | 0.23 | 0.09 | 0.03 | 0.07 | 4.90 |

TABLE 2

| | Analysis of the Plants - Subirrigation Culture | | | | | | | | | | | |
|---|---|---|---|---|---|---|---|---|---|---|---|---|
| EXAMPLE | Type of Plants | Aqueous Solution | K % | Ca % | Mg % | P % | Na % | Fe ppm | Mn ppm | Cu ppm | Mo ppm | B ppm | Zn ppm |
| 1 | Cucumber leaves | $HNO_3$ | 4.35 | 4.92 | 1.03 | 0.56 | 0.2 | 36.7 | 235 | 8.6 | 78 | 74 | 5 |
| Reference 1 | Cucumber leaves | Complete nutritive solution | 5.65 | 4.10 | 0.58 | 0.75 | | 77 | 123 | 10.8 | 7 | 7.9 | 75.2 |
| Reference 2 | Ray Grass | Complete nutritive solution | 5.22 | 0.82 | 0.2 | 0.54 | | 69.7 | 89.7 | 6.9 | 6.2 | 28.5 | 93.7 |
| 2 | Ray Grass | $NH_4NO_3$ | 1.33 | 1.39 | 0.26 | 0.14 | | 8.01 | 77.1 | 17.5 | 23.3 | 28.7 | 173.1 |

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. A method for plant growth and nutrition, comprising:

forming a culture medium of silicon dioxide-based glass fibers comprising at least 25% by weight of silicon dioxide and, with the exception of nitrogen, all the major and minor nutritive essential elements for the nutrition of plants, said major nutritive essential elements comprising $P_2O_5$, $K_2O$, $CaO$, $MgO$, and $SO_3$; said minor nutritive essential elements comprising $Fe_2O_3$, $B_2O_3$, $MnO$, $ZnO$, $CuO$, $MoO_3$; said elements being capable of being removed by a plant's root system from an ambient medium, wherein the quantity and proportion of said major and minor nutritive developments in said glass fibers are selected such that said nutritive elements are soluble and can be assimilated by said plant; and growing a plant thereon.

2. The method of claim 1, comprising supplying the plant with nitrogen by subirrigation with a nitrogenous aqueous solution.

3. The method of claim 2, comprising using a nitrogenous aqueous solution having an acidic pH.

4. The method of claim 3, comprising using a nitrogenous aqueous solution having a pH of 2 to 4.

5. The method of claim 3, comprising using sulfuric acid to acidify the solution.

6. The method of claim 3, comrising using as the nitrogenous solution, a solution of nitric acid.

7. The method of claim 1, comprising growing a plant planted in a soil.

* * * * *